(12) United States Patent
Baudet et al.

(10) Patent No.: US 8,973,489 B2
(45) Date of Patent: Mar. 10, 2015

(54) CARTRIDGE EXTRACTION DEVICE

(75) Inventors: Patrick Baudet, Meyzieu (FR); David Larzul, Meyzieu (FR); Alain Jaccard, Ste-Croix (CH); Blaise Rithener, La Tour-de-Pelix (CH)

(73) Assignee: Nestec S.A., Vevey (CH)

( * ) Notice: Subject to any disclaimer, the term of this patent is extended or adjusted under 35 U.S.C. 154(b) by 47 days.

(21) Appl. No.: 13/513,109

(22) PCT Filed: Dec. 1, 2010

(86) PCT No.: PCT/EP2010/068580
§ 371 (c)(1),
(2), (4) Date: Jul. 10, 2012

(87) PCT Pub. No.: WO2011/067264
PCT Pub. Date: Jun. 9, 2011

(65) Prior Publication Data
US 2012/0266755 A1 Oct. 25, 2012

(30) Foreign Application Priority Data
Dec. 1, 2009 (EP) .................................. 09177592

(51) Int. Cl.
*A47J 31/00* (2006.01)
*A47J 31/40* (2006.01)
(Continued)

(52) U.S. Cl.
CPC .............. *A47J 31/46* (2013.01); *A47J 31/3633* (2013.01)
USPC ................ 99/295; 99/290; 99/302 R; 99/299; 99/300; 99/279

(58) Field of Classification Search
USPC .................. 99/289 R, 281, 295, 302 P, 302 R
See application file for complete search history.

(56) References Cited

U.S. PATENT DOCUMENTS 2,968,560 A * 1/1961 Nathan Goros ................. 99/295
3,260,190 A 7/1966 Levinson
(Continued)

FOREIGN PATENT DOCUMENTS

EP 0676162 10/1995
EP 0730425 9/1996
(Continued)

OTHER PUBLICATIONS

Search Report for International Patent Application No. PCT/EP2010/068580 mailed May 26, 2011.
(Continued)

*Primary Examiner* — Dana Ross
*Assistant Examiner* — Lawrence Samuels
(74) *Attorney, Agent, or Firm* — K&L Gates LLP

(57) ABSTRACT

A device (1) has: a cartridge seat (10) arranged to receive an ingredient cartridge (2) for extraction; a beverage outlet (35) connected to this cartridge seat for dispensing beverage during extraction; and a liquid injection arrangement (50, 60, 61, 70, 80, 81) comprising a pump (60) for pressurizing and circulating liquid from a source (50) via the cartridge seat into the beverage outlet. The liquid injection arrangement further comprises a valve (80') between the pump and the cartridge seat. The liquid injection arrangement is configured to release via the valve (80') pressure from this pressurized liquid in the injection arrangement and maintain liquid in the injection arrangement from the pump (60) to the cartridge seat (10) after the pump is stopped, so as to inhibit dripping from the beverage outlet (35).

16 Claims, 3 Drawing Sheets

(51) Int. Cl.
*A47J 31/46* (2006.01)
*A47J 31/36* (2006.01)

(56) References Cited

U.S. PATENT DOCUMENTS

| | | | |
|---|---|---|---|
| 4,760,774 A | 8/1988 | Lin | |
| 4,793,245 A | 12/1988 | Kimura | |
| 5,242,702 A * | 9/1993 | Fond | 426/433 |
| 5,531,152 A | 7/1996 | Gardosi | |
| 5,794,519 A | 8/1998 | Fischer | |
| 5,878,654 A * | 3/1999 | Kobayashi et al. | 99/299 |
| 6,142,063 A * | 11/2000 | Beaulieu et al. | 99/283 |
| 6,405,637 B1 | 6/2002 | Cai | |
| 6,510,783 B1 * | 1/2003 | Basile et al. | 99/289 R |
| 6,763,759 B2 * | 7/2004 | Denisart | 99/302 P |
| 6,904,840 B1 * | 6/2005 | Pfeifer et al. | 99/295 |
| 6,966,251 B2 | 11/2005 | Yoakim | |
| 7,131,369 B2 | 11/2006 | Gantt et al. | |
| 7,464,636 B2 * | 12/2008 | Mariller | 99/295 |
| 8,210,098 B2 * | 7/2012 | Boussemart et al. | 99/302 P |
| 2005/0106288 A1 | 5/2005 | Blanc et al. | |
| 2006/0090653 A1 | 5/2006 | McDuffie et al. | |
| 2006/0102008 A1 | 5/2006 | Lin | |
| 2006/0196363 A1 * | 9/2006 | Rahn | 99/279 |
| 2008/0050480 A1 * | 2/2008 | Doglioni Majer | 426/231 |
| 2009/0136639 A1 * | 5/2009 | Doglioni Majer | 426/431 |

FOREIGN PATENT DOCUMENTS

| | | | | |
|---|---|---|---|---|
| EP | 0862882 | | 9/1998 | |
| EP | 1219217 | | 7/2002 | |
| EP | 1247480 | | 10/2002 | |
| EP | 1247480 A1 * | 10/2002 | | A47J 31/40 |
| EP | 1353591 | | 10/2003 | |
| EP | 1480540 | | 12/2004 | |
| EP | 1545278 | | 6/2005 | |
| EP | 1566126 | | 8/2005 | |
| EP | 1635680 | | 3/2006 | |
| EP | 1659547 | | 5/2006 | |
| EP | 1669011 | | 6/2006 | |
| EP | 1721553 | | 11/2006 | |
| EP | 1764014 | | 3/2007 | |
| EP | 1774878 | | 4/2007 | |
| EP | 1776026 | | 4/2007 | |
| EP | 1867260 | | 12/2007 | |
| EP | 1893064 | | 3/2008 | |
| EP | 1912542 | | 4/2008 | |
| FR | 2424010 | | 11/1979 | |
| JP | 61-164528 | | 7/1986 | |
| WO | WO0049926 | | 8/2000 | |
| WO | WO2005002405 | | 1/2005 | |
| WO | WO2005004683 | | 1/2005 | |
| WO | WO 2005004683 A1 * | 1/2005 | | A47J 31/00 |
| WO | WO2005016093 | | 2/2005 | |
| WO | WO2005072574 | | 8/2005 | |
| WO | WO2005115206 | | 12/2005 | |
| WO | WO2006005736 | | 1/2006 | |
| WO | WO2006023309 | | 3/2006 | |
| WO | WO2006033049 | | 3/2006 | |
| WO | WO2006066626 | | 6/2006 | |
| WO | WO2007135136 | | 11/2007 | |
| WO | WO 2007135136 A1 * | 11/2007 | | A47J 32/40 |
| WO | WO2008037642 | | 4/2008 | |
| WO | WO2009074557 | | 6/2009 | |
| WO | WO2009130099 | | 10/2009 | |

OTHER PUBLICATIONS

Written Opinion for International Patent Application No. PCT/EP2010/068580 mailed May 26, 2011.
Australia Office Action 2010326758, dated Jul. 11, 2014, 3 pages.
Japanese Office Action for Japanese Application No. 2012-541474, mailed Dec. 2, 2014.

* cited by examiner

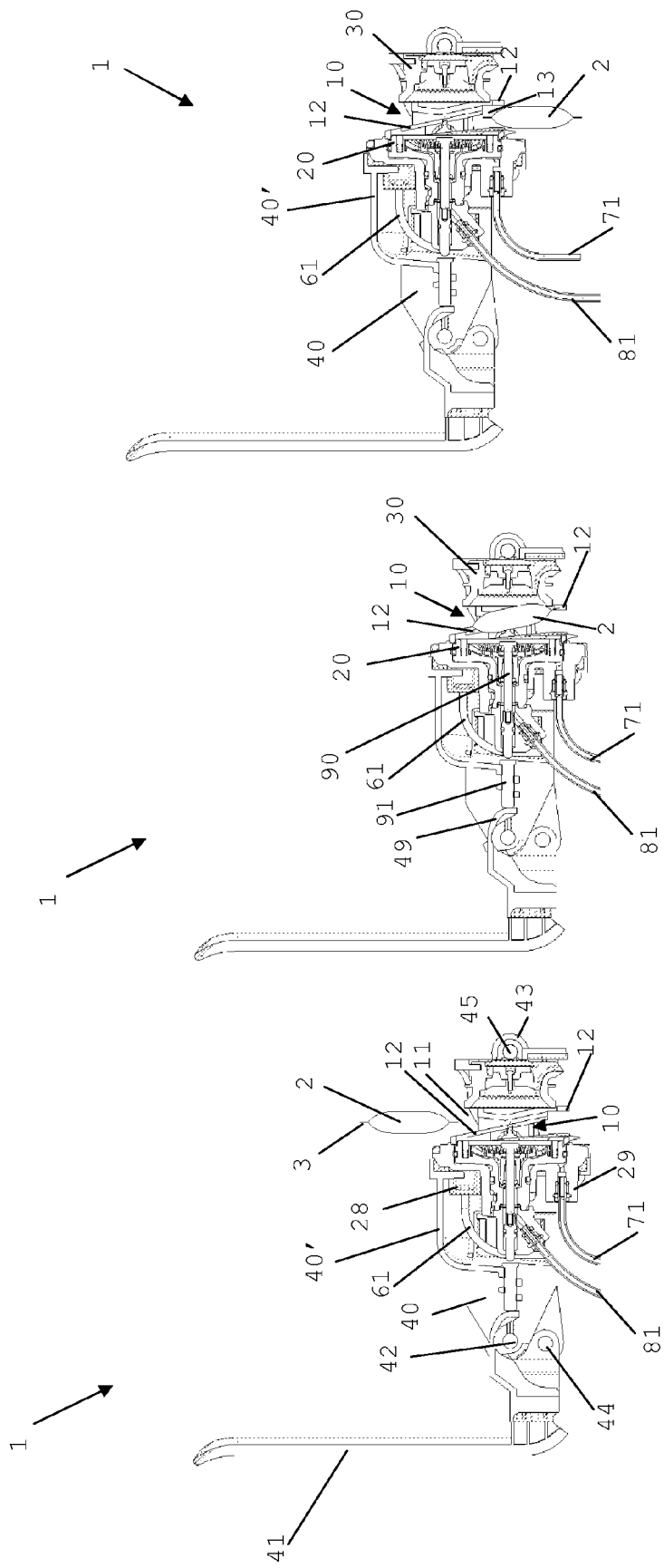

CARTRIDGE EXTRACTION DEVICE

CROSS REFERENCE TO RELATED APPLICATIONS

The present application is a National Stage of International Application No. PCT/EP2010/068580, filed on Dec. 1, 2010, which claims priority to European Patent Application No. 09177592.4, filed on Dec. 1, 2009, the entire contents of which are being incorporated herein by reference.

FIELD OF THE INVENTION

The present invention relates to a cartridge extraction device with a cartridge seat formed by two facing cartridge supports that is arrangement for managing the formation of drips at the device's outlet after the end of an extraction cycle. The extraction device may in particular be used in beverage preparation machines.

For the purpose of the present description, a "beverage" is meant to include any liquid food, such as tea, coffee, hot or cold chocolate, milk, soup, baby food, etc. . . . . . Cartridges designate any enclosure for containing a pre-portioned ingredient whether rigid, such as capsules, or soft or flexible, such as pods, and made of any material, recyclable or non recyclable, biodegradable or non-biodegradable, such as aluminium or plastic, in particular aluminium pods or aluminium capsules.

BACKGROUND ART

One problem encountered with the handling of ingredient cartridges is the positioning of the cartridges in an extraction device and the closing of the latter around the cartridge to perform the extraction process in a clean and hygienic manner. The cartridge usually has to be positioned by the user on a cartridge support or in a housing, then the device is closed manually or automatically around the cartridge.

It is important to correctly position the cartridge so that the device closes properly around the latter and to form a good seal to ensure good conditions of extraction. Bad positioning may damage the cartridge, and thus affect the conditions of extraction.

For the sealing of the device around the cartridge to permit proper extraction by passing a pressurized liquid through the cartridge without undesired leakage, the closing of the device around the cartridge must be carried out with a high level of precision. The closing distance of the mechanical closing arrangements of such devices are usually manually adjusted during the manufacturing process of the device to achieve the required level of precision.

The loading of the capsule must also be easy, without trial and error as to the correct position of the capsule in the device. The loading must also be as rapid as possible and not require excessive manipulations.

WO 2005/004683 relates to a capsule brewing device comprising: a first part; a second part that can be moved relative to the first part; a housing for the capsule and defining, in a closed position of the movable part against the fixed part, an extraction position of the capsule along an axis in said housing; an insertion and positioning part comprising means for guiding the capsule arranged so as to insert the capsule by gravity and position said capsule in an intermediate position; a drink pouring system; and the second movable part is so arranged and constructed to move the capsule from the intermediate position into the extraction position when the device is closed.

EP 1 721 553 discloses a brewing unit for coffee machines using capsules. The unit has a front part with a beverage outlet and a rear part with a hot water inlet. The front part and the rear part are mounted in-between a pair of facing shoulder guide members. The front part is movable in-between these guide members to be urged against the rear part so as to form with the rear part a brewing chamber for accommodating a capsule to be extracted, whereby an unoccupied volume is left in front of the front member between the guide members within the machine.

EP 1 659 547 relates to a beverage machine for making infusions, in particular, espresso coffee. The machine includes an infusion chamber within a brewing unit that has a movable front part with a return spring and a beverage outlet duct that extends through the assembly's outer housing. The movable front part cooperates with a rear part that is movable within the housing and that can be pushed against the movable front part to compress the return spring whereby the outlet duct slides through the assembly's outer housing. The pod is passed through the external housing to the infusion chamber via a rigid pod feed channel and then the pod is transferred into the infusion chamber by an external bushing on the movable rear part of the brewing unit which is provided with a cam-like path for moving the rear part. This arrangement involves several problems. The pod must be moved during the closure of the brewing chamber and this can cause blocking and it also makes the retaining means of the pod more complex. Moreover, opening and closing the brewing chamber involves simultaneously a linear displacement of the movable rear part within the housing, of the movable front part within the housing and of the outlet duct through the housing which increases the risk of hyper-guiding and jamming or improper alignment of the various parts that linearly move one relative to another. The fluid system comprises a moving assembly which makes the fluid system more complex to assemble. When upon extraction brewing unit is re-opened for removing the pod, pressurized water contained within the infusion chamber may project outside the housing. Furthermore, an unoccupied volume is left within the machine between the front member and the casing when the outlet duct is in its retracted position.

U.S. Pat. No. 3,260,190 and WO 2005/072574 disclose a coffee machine having a removable drawer for positioning a coffee can therein. The drawer can be slid horizontally into the coffee machine and lifted towards a water injection arrangement. WO 2006/023309 discloses a coffee machine with a slidable drawer for the introduction of a coffee cartridge into the machine. The drawer is movable between an open and a closed position and has two cartridge half-shells that are pivotable against each other to form a brewing chamber when the drawer is in the closed position and pivotable apart when the drawer is slid out from the machine. U.S. Pat. No. 6,966,251 discloses a coffee machine having a horizontally slidable drawer for positioning a capsule therein. When slid into the machine, the drawer can be moved upwards towards a fixed capsule cage for form a brewing chamber for a capsule. EP 1 566 126 discloses a coffee machine with a vertical brewing unit for accommodating coffee pods. The brewing unit has a fixed upper part and a movable lower part for holding a pod and that can be pulled up for closing the brewing unit and let down for inserting or removing a pod.

WO 00/49926 discloses a coffee machine having an infusion chamber with an upper part movable from a first raised position to a second lowered position and a lower part made on a movable trolley arranged below the upper part.

Further brewing units are disclosed in EP 0 730 425, EP 0 862 882, EP 1 219 217, EP 1 480 540, EP 1 635 680, EP 1 669

011, EP 1 774 878, EP 1 776 026, EP 1 893 064, FR 2 424 010, U.S. Pat. No. 3,260,190, U.S. Pat. No. 4,760,774, U.S. Pat. No. 5,531,152, U.S. Pat. No. 6,904,840, U.S. Pat. No. 7,131, 369, US 2005/0106288, US 2006/0102008, WO 2005/002405, WO 2005/016093, WO 2006/005756, WO 2006/066626 and WO 2007/135136.

To avoid the problem relating to precise mechanical closing of the extraction device around an ingredient cartridge, it is known to provide a hydraulic closure system in which the heated water used for extracting an ingredient in a cartridge is also used to actuate a hydraulic closure mechanism. In this case, the closing distance does not require special adjustment since the hydraulic closing force urges the cartridge supports of the extraction device together around the cartridge. An example of such a system is for instance disclosed in WO 2008/037642. Various systems have been developed along this idea, as for instance discussed in EP 1 219 217, EP 1 480 540, EP 1 776 026, EP 1 912 542, WO 2005/115206, and WO 2006/005736.

A problem with using heated water to actuate the closure mechanism lies in the risk of scale deposition from the heated water in the hydraulic mechanism.

It has been proposed in EP 1 545 278 to implement two parallel water lines connected to a single water source and both controlled by a common multi-way valve. One water circulation circuit, the extraction circuit, passes via a heater into the extraction device and the other water line, unheated, is used for the hydraulic closure of the extraction device. In a first step, the multi-way valve permits supply of pressurized water to the hydraulic closure system of the extraction device. Once the extraction device is closed, the pressure built up in the hydraulic closure system by the presence of the pressurized static, forces the circulation of water in the second line through a check valve into the extraction device via the heater. Once extraction is over, the common multi-way valve is moved into a position to connect the hydraulic closure system with a purging circuit to evacuate the pressurized water that had been statically captured in the hydraulic water circuit during extraction and to evacuate the surplus water not injected into the extraction circuit. A similar system is disclosed in EP 1 353 591.

One problem with this solution lies in the complication of the parallel water circuits for the hydraulic closure and for the hot injection and the multi-way control valve associated therewith. Another problem with this system lies in the fact that by having to purge the hydraulic water circuit upon each and every extraction cycle, the circuit must first be replenished before being operative for closing the brewing unit. However, since the liquid is non-circulating, stagnant in the hydraulic closure system during the extraction process purging is necessary to avoid contamination and hygiene-related issues in this part of the circuit.

The principle, as such, of purging the fluid circuit of a beverage preparation machine is known in the field. For example, EP 1 764 014 discloses a beverage preparation machine with a fluid circuit including a pump and inline thermoblock heaters leading to hot water, steam and beverage dispensing outlets. The fluid circuit includes a fluid evacuation valve at the inlet sides of the heaters to reduce scale deposition in the serpentines of the thermoblocks. The evacuation valve at the inlet sides of the thermoblocks cooperate with a valve downstream the thermoblock that is opened simultaneously for venting the thermoblock, i.e. replacing the fluid by air in the thermoblock. This operation is carried out once a thermoblock has not been used for a defined time period. In other words, the this operation makes sense to be carried out when the machine is idling or goes idling for an extended period of time or when shut down or when entering a standby mode.

Another problem relates to the dripping of liquid form the beverage machine's outlet after a dispensing cycle is over. This may happened when the system is maintained in a state of immediate readiness for a further extraction cycle, i.e. with the water circuit filled with water instead of being empty. This contrasts with systems that are purged each time immediately after a beverage preparation cycle is over, as disclosed in the abovementioned EP 1 545 278 with its multi-way valve for purging parallel water circuits for the extraction and for the hydraulic closure.

Indeed, especially with the preparation of coffee or tea by extracting ground coffee or tea in a brewing chamber that leads to a beverage outlet, drips tend to be formed at the beverage outlet for an extend period of time after the machine's pump has been shut off and the system is not purged to maintain immediate readiness for a further extraction cycle. Moreover, at the end of an extraction cycle, the user wonders when he or she should pick up the cup from under the beverage outlet as the dispensing still seems to continue at a slow, dripping pace after shut-off of the pump. To avoid that the machine and/or its surrounds get dirty by such drips, it can be fitted with a drip collector positioned under the beverage outlet to collect the drips upon removal of the filled cup from under the outlet. Examples of such drip collectors are for example disclosed in EP 1 867 260, EP 1 811 881 and WO 2009/074557.

These drip collectors provide a solution for the hygiene problem resulting from such drips. There is however still a need for a solution to the unclear end of a beverage dispensing cycle, so that a user does not have to wonder when to remove his of her cup from under the beverage outlet.

SUMMARY OF THE INVENTION

One aspect of the present invention relates to a device for receiving an ingredient cartridge and extracting the ingredient by passing liquid through the cartridge. The device has: a cartridge seat arranged to receive such cartridge for extraction; a beverage outlet connected to such cartridge seat for dispensing beverage during extraction, typically to a user, e.g. into a user cup or mug placed thereunder; and a liquid injection arrangement comprising a pump for pressurising and circulating liquid from a source via the cartridge seat into the beverage outlet, e.g. a reciprocating piston pump or a rotary pump which is known in the art of beverage preparation machines. The liquid injection arrangement further comprises a valve between the pump and the cartridge seat.

Typically, this device is comprised in a beverage preparation machine for receiving ingredient cartridges such as capsules and/or pods. For instance, the machine is a coffee, tea, chocolate or soup preparation machine. In particular, the machine is arranged for preparing within the cartridge seat a beverage by passing hot water or another liquid through a cartridge containing an ingredient of the beverage to be prepared, such as ground coffee or tea or chocolate or cacao or milk powder.

For example, the preparation machine comprises: a beverage preparation unit arranged to receive cartridges for use and evacuate cartridges upon use, e.g. an extraction device; a housing having an opening leading into an area to which cartridges are evacuated from the preparation unit; and a receptacle having a cavity forming a storage space for collecting cartridges evacuated to such an area into the receptacle to a level of fill. The receptacle is insertable into the area for collecting used cartridges and is removable from this area for emptying the collected cartridges. Examples of such machines are disclosed in WO 2009/074550 and in WO 2009/130099.

The pump is typically configured to provide an elevated pressure in the liquid circulated into the cartridge seat, typically in the range of 5 to 25 bar, such as 10 to 20 bar.

In accordance with the invention, the liquid injection arrangement is configured to release via the valve pressure from this pressurised liquid in the injection arrangement and maintain liquid in the injection arrangement from the pump to the cartridge seat after the pump is stopped, so as to inhibit dripping from the beverage outlet. This pressure release valve is in particular a one-way valve.

Hence, the liquid injection arrangement is configured to release the pressure upstream the cartridge seat at the end of the operation of the pump by opening a pressure release valve located between the pump and the cartridge seat. This may involve the evacuation of a small amount of liquid via this valve in order to release the pressure in the liquid between the pump and the cartridge seat. Unlike the prior art arrangement, e.g. as disclosed in EP 1 545 278 and in EP 1 764 014, in this configuration, liquid remains in the injection arrangement which is not purged and which does not need to be replenished for a subsequent extraction cycle. By merely releasing the pressure upstream the cartridge seat, liquid contained in the injection arrangement upstream the cartridge seat does not force its way out through the cartridge seat and outlet of the cartridge seat. Hence, the formation of drips at the outlet resulting from such a phenomenon, is effectively inhibited by providing such an injection arrangement with a pressure release valve, in particular a one-way valve. With such a configuration, the drip formation may be noticeable reduced or even suppressed, in particular when combined with an opening of the cartridge seat.

Moreover, by merely releasing pressure in hot parts of the injection arrangement, e.g. an in-line heater of the arrangement, without purging, evaporation-related scale deposition can be inhibited in these hot parts. Indeed such in-line heaters are typically configured to heat a circulating liquid from room temperature to a temperature in the range of 60 to 95° C., in particular 80 to 93° C. During normal use, no evaporation takes place in the heater. However, if the heater is emptied too soon after use, the liquid therein may be evaporated. Therefore, it is preferable to maintain the liquid in the injection arrangement after use instead of purging immediately. Hence, to prevent dripping, the elevated pressure generated by the pump in the liquid is released via the pressure release valve instead of via the cartridge seat and liquid is maintained in the heater to prevent evaporation in the heater and scaling of the heater.

To carry out the pressure release operation, the pressure release valve may be linked to the pump operation and/or to a control unit of the extraction device that controls the operation of the different parts thereof, e.g. an electric control unit, as disclosed in WO 2009/130099 which is hereby incorporated by way of reference.

As discussed above, the liquid injection arrangement is configured, in a first mode, to release said pressure and maintain said liquid upon pressure release in the liquid injection arrangement between the pump and the cartridge seat. Moreover, in a second mode, the liquid injection arrangement can be further configured, to purge said liquid from the injection arrangement between the pump and the cartridge seat, in particular by venting the injection arrangement therebetween through the pressure release valve. In other words, in addition to being able to merely prevent formation of drips at the outlet of the cartridge seat after each extraction cycle, the liquid injection arrangement may be further configured, in a different mode of operation, for purging, e.g. as disclosed in EP 1 764 014, the content of which is hereby incorporated by way of reference.

The liquid injection arrangement can be configured to open this pressure release valve for a period of time of at least 0.05 sec, in particular a period of time in the range of 0.1 to 2 sec, optionally 0.25 to 1.5 sec, such as 0.4 to 1 sec. Opening the pressure release valve for a short period of time is sufficient to release the pressure when purging of the injection arrangement is not required like in prior art systems.

Typically, the liquid injection arrangement comprises an inline heater between the pump and the cartridge seat, the valve being in particular located between the pump and the heater. When the pressure release valve is used to purge the system in the optional mode of operation of the injection arrangement, the heater would normally be allowed to cool down a little before purging the liquid in the heater so as to prevent increased heat-related scale deposition. Conversely, when the pressure release valve is used to merely reduce the pressure of the liquid in the injection arrangement, the liquid is not purged from the heater and there is no indication to wait for the heater to cool down. The pressure release operation can be carried out with the end of the pump action or shortly thereafter.

In one embodiment, the cartridge seat comprises a first cartridge support and a second cartridge support facing the first support, the first and second cartridge supports being arranged to be movable relative to one another from an open position—for insertion or removal of a cartridge into the seat—to a closed position—for passing liquid through such a cartridge.

At least one support of the cartridge supports can be hydraulically actuatable and movable into the closed position by the liquid injection arrangement.

The liquid injection arrangement is typically configured to shortly delay, after the pump is stopped, the release of pressure in said liquid, in particular to delay by a period of time in the range of 0.1 to 5 sec, in particular 0.25 to 2 sec, such as 0.4 to 1 sec. Such a delay can prevent immediate return of the hydraulically actuatable and movable cartridge support and early reopening of the cartridge seat with the likelihood of destructive expansion of the cartridge before the pressurised injected liquid contained in the cartridge had had sufficient time to depressurise mechanically confined in the cartridge seat. In the absence of a hydraulic actuation system, the pressure release via the pressure release valve may be generally concurrent with the stopping of the pump or delayed.

Hence, after stopping the pump and for a short period of time, the liquid under pressure in the cartridge seat, in particular in an upstream part thereof, can be allowed to find its way to the outlet of the cartridge seat, i.e. end the normal pressure extraction.

In the absence of a anti-return valve, for example a second valve as discussed below, if the pressure release is started concurrently with the end of the pump action, it may happen that the pressurised liquid in the upstream part will find its way backwards into the liquid injection arrangement. Thus, by avoiding concurrent stopping of the pumping action and pressure release via the valve, a reverse drought of liquid from the cartridge seat into the injection arrangement can be prevented. However, it is preferable to provide such a second valve to allow no return at all of any liquid from the cartridge seat into the injection arrangement.

Moreover, the liquid injection arrangement can be configured to open the pressure release valve until the cartridge seat is hydraulically re-closed, i.e. the pump reactivated, to make sure that the hydraulically actuatable and movable cartridge support is allowed to move back and forth for resealing the cartridge seat at closure thereof. The cartridge seat may be associated with a position sensor for detecting the position of the hydraulically actuatable and movable cartridge support and close the pressure release valve once this support is detected in its open (retracted) position. The hydraulically actuatable and movable cartridge support may also associated with a return spring to bring the actuatable and movable cartridge support support back into its open (retracted) position at pressure release via the pressure release valve, in which case the pressure release valve may be opened for a short period of time only, e.g. as discussed above.

In any case, to inhibit dripping depressurised liquid is maintained in the injection arrangement from the pump to the cartridge seat. Venting or purging of the injection arrangement is not required.

The liquid injection arrangement may be configured to: pressurise and circulate unheated liquid to this cartridge support for actuating and moving this cartridge support by the circulating unheated pressurised liquid; and guide this circulating unheated pressurised liquid under pressure from this support via a heater into the cartridge seat for extracting the ingredient.

Typically, the hydraulically actuatable and movable support has a linear displacement configuration. The hydraulically actuatable and movable support may be associated with an expansion chamber through which the pressurised liquid is circulated for expanding the chamber and displacing the hydraulic support.

This hydraulically movable cartridge support can comprise a hydraulic piston, such as a piston movable in a piston chamber, the liquid injection arrangement being connected to the piston chamber for injecting pressurised liquid into the chamber and driving hydraulically the support with the piston against the facing support into the closed position. In this case, the liquid injection arrangement is configured to inject unheated pressurised liquid into the piston chamber and to guide via the inline heater this liquid under pressure from the piston chamber into the cartridge seat. The piston chamber may have an inlet and an outlet for circulating pressurised liquid through the piston chamber while the cartridge supports are in the closed position.

Hence, the liquid that can be pressurised to actuate the hydraulic closure mechanism, i.e. the piston moving in the piston chamber, circulates under pressure from the inlet to the outlet of the piston chamber and continues to circulate still under pressure from the piston chamber to the cartridge seat via a heater during the entire extraction process. In other words, there is a continuous pressurised circulation path of the liquid through the piston chamber, the heater and into the cartridge seat. However, the liquid circulates unheated through the piston chamber, which inhibits scale deposition therein, and is heated still under pressure thereafter in the heater to be then injected upon heating and still under pressure into the cartridge seat.

It is of course possible to have each cartridge supports of the device hydraulically actuatable and movable, in particular by being associated with its own hydraulic piston and piston chamber. In this case, the fluid injection arrangement may be configured to circulate under pressure liquid from one piston chamber to the other piston chamber and then circulate the liquid still under pressure through a heater and then into the cartridge seat.

The liquid injection arrangement may be arranged to circulate unheated pressurised liquid from this cartridge support via a second valve, e.g. a check-valve, into the cartridge seat, which second valve is configured for building up a controlled pressure in said unheated circulating liquid that actuates and moves said at least one support. In particular, the injection arrangement may have a second valve between an outlet of the piston chamber and an inlet of the cartridge seat for building up a controlled pressure in the liquid circulating under pressure through the piston chamber. Such a second valve may also act as an anti-return valve to avoid the return of any liquid from the cartridge seat. In a less preferred embodiment, it is also possible to omit this valve and use the ingredient cartridge properly positioned against the liquid inlet of the cartridge seat to build up the pressure in the liquid for actuating the hydraulic support.

The hydraulically movable cartridge support can be arranged to be moved away from the facing support by the pressure release in the liquid injection arrangement via the valve. The extraction device may have a drip tray, in particular associated with a used cartridge collector, for collecting liquid draining from in-between the cartridge supports that are moved away from one another. In this particularly advantageous configuration, the liquid contained in the cartridge seat at the end of the pumping process is allowed to escape directly from the passage formed by the hydraulic reopening of cartridge seat without passing through the beverage outlet, this reopening being caused automatically by the pressure release valve in the injection arrangement. The liquid draining from the cartridge seat may be collected into a drip tray collector and/or capsule collector or another dedicated collection arrangement.

Such a drip tray collector and cartridge collector underneath the cartridge seat may also be provided irrespectively of any hydraulic actuation of the cartridge seat, e.g. as disclosed in EP 1 867 260.

If necessary, the reopening, in particular the hydraulic reopening, of the cartridge seat may be mechanically automatically assisted, e.g. by using a spring means that is biased at closure of the cartridge seat and that assists reopening by slackening.

The liquid injection arrangement may be configured to inject heated liquid into the cartridge seat through a liquid inlet in one of the cartridge supports, the facing cartridge support having an outlet for dispensing liquid upon extraction of the ingredient.

The liquid injection arrangement can be configured to inject heated liquid into the cartridge seat through a liquid inlet of the seat that is located in one of the cartridge supports, the facing cartridge support having an outlet for dispensing liquid upon extraction of the ingredient of the cartridge.

At least one of the cartridge supports can be movable towards and away from the facing cartridge support by a mechanical drive arrangement, such as a mechanical drive arrangement comprising a force transmission lever, in particular a knuckle arrangement, and/or a force transmission gear arrangement, in particular a spur gear arrangement. Optionally this mechanical drive arrangement is actuated by a hand-drivable handle and/or by a motor, in particular an electric motor.

Typically, the mechanical drive arrangement is configured to move the cartridge supports together over a predominant portion of the closing distance, e.g. over 80%, 90% or 95% of the closing distance, and use the hydraulic closure for the tight sealing of the two cartridge supports together. Hence, the tight sealing is not achieved by controlling the end of the closure distance but by acting on the closure pressure in the piston chamber. It follows that tolerance issues on the closing distance of the cartridge seat and manual fine adjustment thereof can be avoided. For instance, the hydraulic closing distance is in the range of 0.05 to 2 mm, in particular 0.1 to 1 mm, such as 0.2 to 0.7 mm. This contrasts significantly with purely mechanical closure systems (non hydraulic) that must be adjusted with high tolerances, usually by hand, during the assembly process.

One of these first and second cartridge supports can be movable by the mechanical drive arrangement to and away from the facing cartridge support that is hydraulically actuatable and movable. The hydraulically actuatable and movable cartridge support can be further movable by the mechanical drive arrangement.

The liquid injection arrangement may be configured to inject heated liquid into the cartridge seat through a liquid inlet of the seat that is located in the hydraulically actuatable and movable cartridge support. In other words, the same cartridge support of the seat can be associated with the unheated water circulation and with the heated water circulation. Hence, the upstream fluid circulation arrangement leading into the cartridge seat may be maintained in association with one cartridge support only, i.e. it does not have to extend over with both supports. This reduces the length of the connection ducts. Moreover, this can be a significant advantage when the piston chamber is maintained fixed in the extraction device since flexible liquid circulation ducts, which are difficult to assemble in an automatic assembly process, can be minimised or even avoided in favour or rigid ducts that can be assembled automatically.

The heater may be associated with a temperature regulating arrangement. The temperature regulating arrangement can comprise at least one temperature sensor selected from temperature sensors that are located: upstream the hydraulically actuatable and movable support; in and/or adjacent the hydraulically actuatable and movable support; between the hydraulically actuatable and movable support and the heater; in the heater; between the heater and the cartridge seat; and in and/or adjacent the cartridge seat.

In one embodiment, the temperature regulating arrangement includes a temperature sensor at the liquid outlet of the heater. The temperature sensor(s) is/are preferably connected to an electric control circuit of the heater in particular for a loop regulation of the heater.

For example, the system has a first sensor for sensing the temperature of the liquid between the piston chamber and the heater and a second sensor of sensing the temperature between the heater and the cartridge seat. These two sensors are used to control the powering of the heater to adjust the temperature of the water exiting the heater.

The invention also relates to a system that includes an ingredient cartridge and a device as described above, the ingredient cartridge being held in the cartridge seat of this device.

In the context of the above description, "heated liquid" means liquid that has been directly heated by the heater of the extraction device. "Unheated liquid" means liquid that has in particular not as yet exited the piston chamber and passed through the heater. Thus, the designation of "unheated liquid" includes the liquid from the source of liquid, e.g. a tank, upstream the piston chamber and inside the piston chamber and generally upstream the heater.

Further features and advantages of the invention will appear in the description of the detailed description.

BRIEF DESCRIPTION OF THE DRAWINGS

The invention will now be described with reference to the schematic drawings, wherein:

FIGS. 1a to 1c show cross-sectional views of part of the beverage extraction device according to the invention, the device being in an open configuration;

DETAILED DESCRIPTION

Figure 2B:
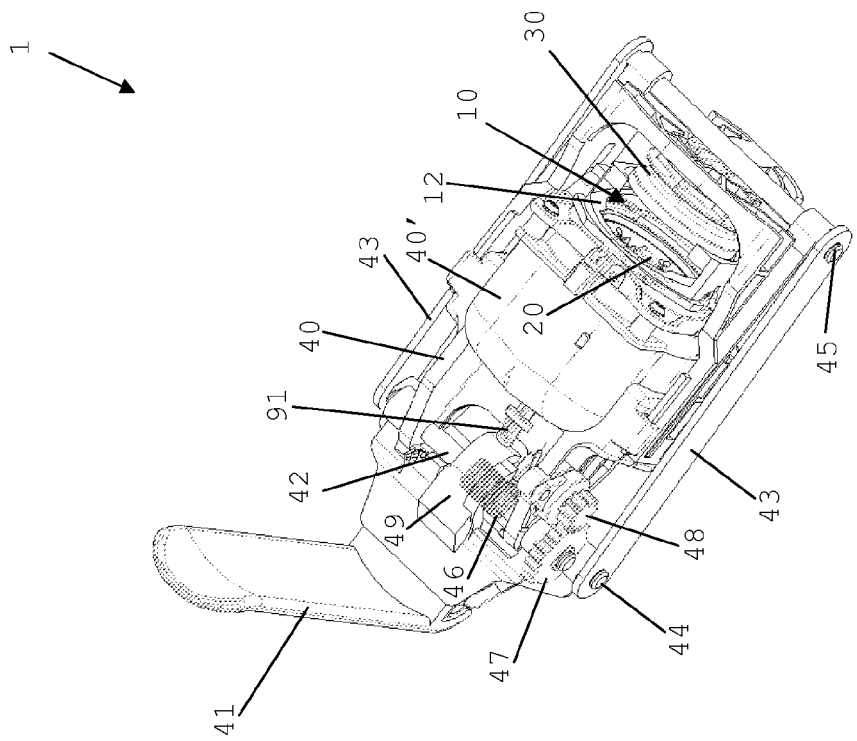
FIGS. 2a and 2b show perspective views of part of the same beverage extraction device in a closed and open configuration, respectively.

The invention is now described with reference to the particular embodiment illustrated in FIGS. 1a to 3.

These Figures show an extraction device 1 of a machine for preparing beverages by circulating heated liquid, such as water, through an ingredient cartridge 2 in the form of a soft pod, e.g. made of a sealed and airtight aluminium envelope containing the beverage ingredient e.g. ground coffee, as for example commercialised by NESPRESSO™.

Extraction device 1 has a cartridge seat 10 comprising a first cartridge support 20 and a second cartridge support 30 facing first cartridge support 20 arranged to receive cartridge 2 in an open spaced apart configuration and to enclose cartridge 2 in a closed urged together extraction configuration. FIGS. 1a, 1b, 1c and 2b illustrate cartridge seat 10 with cartridge supports 20,30 in their open spaced apart configuration. FIGS. 2a and 3 show cartridge seat 10 with cartridge supports 20,30 in their closed urged together extraction configuration in which cartridge 2 is enclosed in seat 10.

FIG. 1a illustrates the insertion by gravity of cartridge 2 from above into cartridge seat 10. More specifically cartridge 2 is shown above a cartridge inlet channel 11 that leads to seat 10 underneath.

In FIG. 1b, cartridge 2 is shown held in cartridge seat 10 in an open position prior to extraction. Cartridge seat 10 is associated with cartridge retaining members 12 for holding cartridge 2 in seat 10 while support members 20,30 are in their spaced apart open position. More specifically, retaining members 12 are arranged at the periphery of seat 10 so that rim 3 of cartridge 2 rests on and against members 12 in this intermediate cartridge loading position. When support members 20,30 are urged together, cartridge 2 with rim 3 is pushed by support member 30 through peripheral member 12 against facing member 20 into the cartridge extraction position in which cartridge 2 is enclosed in-between support members 20,30 (as shown in FIG. 3).

In FIG. 1c, cartridge seat 10 is shown in its reopened position upon extraction with support members 20,30 in their spaced apart configuration. Device 1 is arranged to evacuate used cartridge 2 by gravity from seat 10 via a lower evacuation passage 13. Cartridge 2 may be collected in a cartridge collector (not shown) located underneath seat 10.

The general principle of the extraction device with the retaining members relating to the insertion, intermediate positioning, enclosing and evacuation of cartridge 2 is disclosed in greater details in EP 1 859 714, in particular for soft or flexible cartridges, e.g. pods, as well as in EP 1 646 305, in particular for rigid cartridges, e.g. capsules. These publications are hereby incorporated by way of reference.

In FIGS. 2a and 3 support members 20,30 are shown urged together enclosing cartridge 2 in seat 10.

As shown in greater details in FIG. 3, hydraulic cartridge support 20 has a tubular piston 21 movable in a piston chamber 25. Piston chamber 25 is delimited by an outer generally cup-shaped front part 26 holding the front part of capsule support member 20 and by a generally tubular rear part 27 inside and along which piston 21 is movable.

Moreover, extraction device 1 is associated with a liquid injection arrangement that includes: a source of liquid, such as cold water in particular stored in a reservoir 50, a pump 60 for pumping liquid from reservoir 50 via a pipe 61 and chamber inlet 28 under pressure into piston chamber 25 and then still under pressure via chamber outlet 29 into inline heater 70 via tube 71 and then, from heater 70 via check-valve 80, tube 81 into piston tube 21 forming a heated liquid inlet of cartridge seat 10.

In cartridge seat 10, the pressurised and heated liquid flows through cartridge 2 to form a beverage by extraction of the ingredient contained in cartridge 2, the beverage being collected and dispensed via outlet 35 associated with cartridge support 30, for example into a user cup or mug located thereunder.

For the sake of clarity, the liquid flow path through extraction device 1 is schematically indicated by the thick arrows in FIG. 3.

Hence, this liquid injection arrangement is connected to the piston chamber 25 for injecting unheated pressurised liquid into chamber 25 and driving hydraulically cartridge support 20 with piston 21 against facing cartridge support 30 into the closed position. Seals 22,23, e.g. o-ring seals, between cartridge support 20,21 and front and rear parts 26,26 prevent leakage from chamber 25. Upon circulation through piston chamber 25, the liquid is further circulated continuously under pressure from piston chamber 25, through heater 70 into cartridge chamber 10.

Moreover, cartridge support 30 is movable towards and away from facing cartridge support 20 by a mechanical drive arrangement.

Figure 2A:
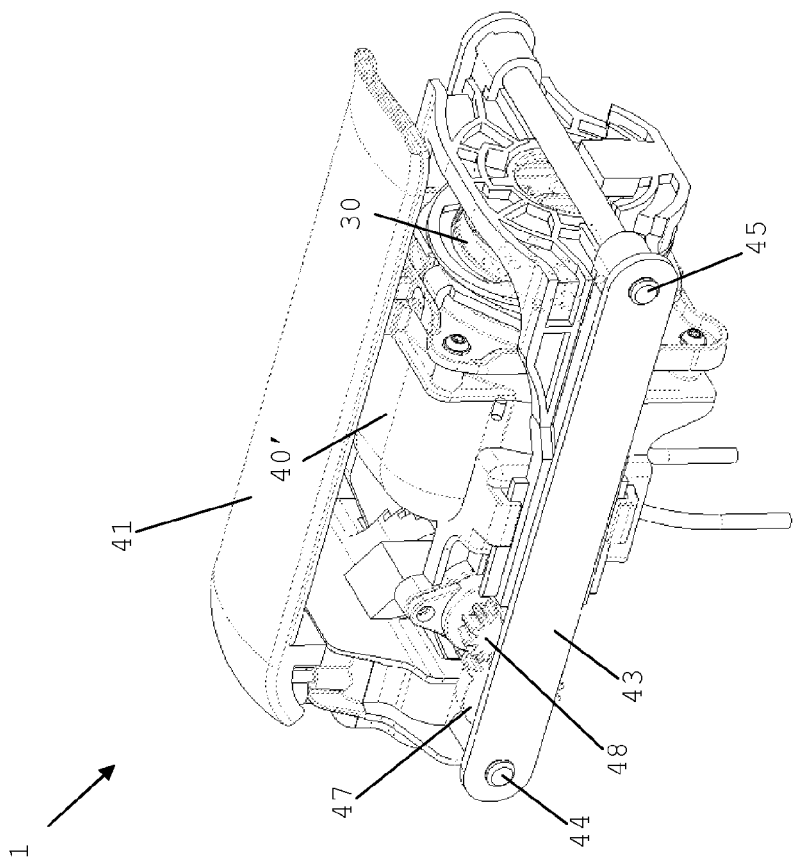
Figure 3:
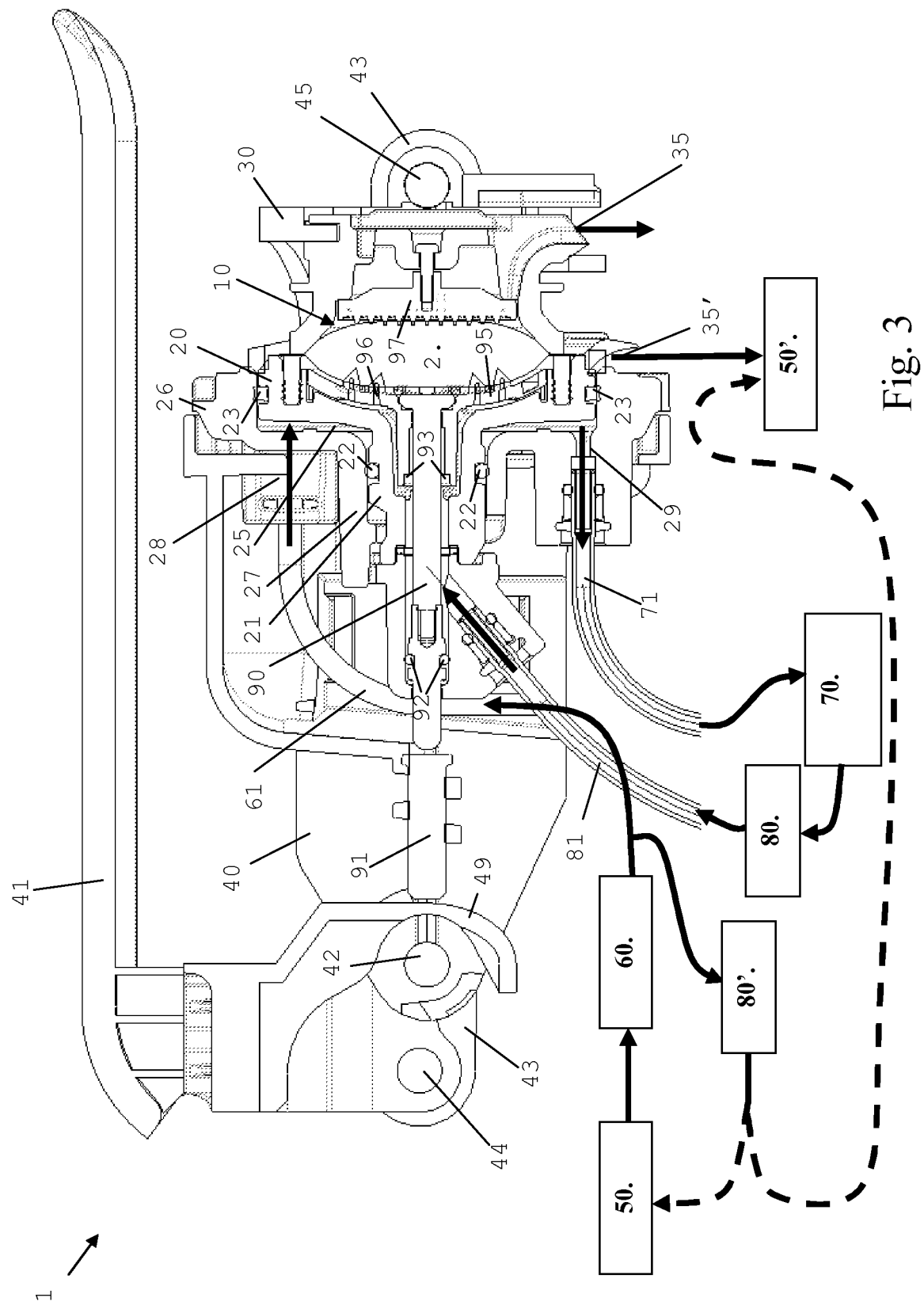
FIG. 3 shows a cross-sectional and partly schematic view of the beverage extraction device of FIGS. 1a to 2b in the closed configuration.

As shown in greater details in FIGS. 2*a* and 2*b*, the mechanical drive arrangement comprise a hand-drivable handle 41 pivotally mounted on a fixed frame 40 via an axis 42 of handle 41. A pair of cranks 43 are at one extremity 44 rotatably mounted on handle 41 at a distance from axis 42 and at their other extremity 45 pivotally mounted to cartridge support 30, so that when handle 41 is pushed from the open position (FIG. 2*b*) into the closed position (FIG. 2*a*), cranks 43 are driven by handle 41 pivoting about axis 42 to pull cartridge support 30 towards cartridge support 20. Various mechanical drive arrangements, manually actuated or motorised, may be used to implement this optional aspect of the invention, for instance as disclosed in EP 1 646 305, EP 1 859 713, EP 1 767 129 and WO 2009/043630 which are hereby incorporated by reference.

Frame 40 also bears a housing panel 40' for shielding tube 61, inlet connection 28 and front and rear parts 26,27 delimiting piston chamber 25. Front and rear parts 26,27 are also fixed to frame 40. Hence, tubes 61,71 can be mounted between fixed elements 26,60,70,80 and may be made of rigid materials that can be easily handled in an automatic manufacturing process of the extraction device.

Furthermore, to facilitate reopening of handle 41, a spring element is provided that is stressed during the closing movement and that drives handle 41 back automatically in the opening movement. In particular, a helicoidal spring 46 has one end secured to frame 40 and another end secured to axis 42. Helicoidal spring 46 is mounted around axis 42. Different spring arrangements may of course be provided to produce this or a similar effect. Moreover, to provide an ergonomic feel of control of the mechanical drive arrangement during the opening and closing movement via handle 41 in order to improve the comfort for the user when actuating handle 41, a movement dampener is provided. In this particular example, the dampener is provided in the form of spur gears that follow the rotation of axis 42. Hence, a first toothed wheel 47 is assembled to axis 42 and a second toothed wheel 48 cooperating with first wheel 42 is rotatably mounted on frame 40 to dampen the rotation of axis 42.

It is of course possible to mount the spring in the opposite direction, i.e. to assist the closure movement of the extraction device.

Further details on ergonomic aspects of the extraction device are disclosed in EP 09173600.9, the content of which is hereby incorporated by way of reference.

Extraction device 1 is also provided with a cartridge ejector 90 for ejecting cartridge 2 at reopening upon extraction so as to assist evacuation of cartridge 2. Ejector rod 90 is movable within tubular piston 21 and actuated via cam 49 and cam-follower 91 by the movement of handle 41 to which cam 49 is connected. In FIG. 3, ejector 90 is shown in its retracted position whereas in FIG. 1*b*, ejector 90 is shown in its deployed position to eject cartridge 2 from cartridge support 20.

Also shown in FIG. 3, cartridge support 20 is fitted with a sprinkler 95 for injecting heated liquid into cartridge 2 via hollow needles 96 for piercing cartridge 2. During use, heated liquid is delivered under pressure from tube 81 into tubular piston 21 around to circulate around ejector 91 along sprinkler 95 and into cartridge 2 via needles 96. Seals 92,93, e.g. o-ring seals, are provided to prevent leakage along ejector 90 of the injected water. Facing cartridge support 30 bears an opening arrangement 97, e.g. in the form of a plate with tearing elements such as a pyramid plate. Hence, heated fluid injected into cartridge 2 via needles 96 extract the ingredient contained in the cartridge and leaves cartridge 2 at opening arrangement 97 from where it is circulated to dispensing outlet 35. A cup or mug can then be used to collect the beverage dispensed at outlet 35 that is connected to cartridge support 30. Upon extraction, ejector 90 is particularly helpful to detach cartridge 2 from needles 96.

Upon introducing a cartridge 2 into open seat 10 (FIG. 1*b*), the user moves down handle 41, whereby the front part of extraction device 1, i.e. cartridge support 30, is driven in translation by crank 43 and lever mechanism placed on both side of extraction device 1. Thereby, cartridge 2 is forced beyond retaining members 12 by bending peripheral flanges 3 of cartridge 2. Once the mechanical closing movement via handle 41 is over, cartridge 2 is caught between pyramid plate 97 and sprinkler 95, pierced by needles 96. At this stage, a near sealing of cartridge seat 10 around cartridge 2 is achieved. In this almost closed configuration, cartridge supports 20,30 are typically spaced apart by less than 2.5 mm usually less than 1.5 mm, such as less than 0.5 mm.

Further details of such a hydraulic closure system are disclosed in EP 09172187.8, which is hereby incorporated by way of reference.

In a variation, it is also possible to configure the closing distance such that piercing of the cartridge occurs under the effect of the hydraulic closure of the cartridge seat instead of under the mechanical closure. This offers the advantage that the user does not have to provide the increased closure force for piercing the cartridge. This closure force is then provided by the pump.

Handle 41 may be so arranged in frame 40 so that when handle 41 reaches the horizontal position, a feeling of locking is given to users so as to provide the user an ergonomic feed-back of the end of the movement.

Once pump 60 is activated to prepare a beverage, unheated liquid, e.g. cold water, is sent to piston chamber 25. Then the liquid leaves piston chamber 25 and flows through heating element 70 and thereafter until check-valve 80. When the pressure in the fluid starts to increase in front of check-valve 80, cartridge support 20 with piston 21 is translated and urged under the increasing pressure of the liquid in piston chamber 25 against facing cartridge support 30 to properly seal cartridge 2 within cartridge seat 10. Opening of valve 80 occurs at a pressure level sufficient to avoid any leakage between capsule supports 20,30, as illustrated in FIG. 3.

When valve 80 opens to allow the passage of the fluid, pressurized heated liquid flows to sprinkler 95 and into cartridge 2 via needles 96, whereby the pressure increases in cartridge 2 until the cartridge is torn open on pyramid plate 97 to allow the liquid to flow out of cartridge 2 during extraction.

To evacuate capsule 2 upon use, the user releases handle 41 which opens automatically under the effect of spring 46 at a controlled speed under the effect of dampener 47,48.

Thereby, the front part of extraction device 1, i.e. cartridge support 30, is driven away from the rear part of extraction device 1, i.e. cartridge support 20. This leads to further opening cartridge seat 10 while ejector is deployed under the effect of cam 49 and cam follower 91 to push cartridge 2 away from cartridge support 20 and allow it to fall under the effect of gravity from cartridge seat 10 (FIG. 1c), e.g. into a used capsule collector (not shown) located thereunder.

The fluid circuit of device 1 includes between pump 60 and cartridge seat 10 an arrangement to release upon extraction the pressure built therein by pump 60 during extraction. In particular, downstream pump 60, liquid of the fluid system may be diverted via one-way valve, e.g. electro-valve 80', back into reservoir 50 or into a drip tray collector 50' as indicated by the dashed arrows in FIG. 3. As shown in FIG. 3, heater 70 may be situated downstream valve 80'. However, for the purpose of pressure reduction in the injection circuit, the pressure reduction valve may be located anywhere downstream the pump, e.g. on or after heater.

As illustrated in FIG. 3, valve 80' is arranged in the injection circuit to release the pressure generated in and downstream pump 60 by pump 60 itself. Pump 60 is configured to provide an elevated pressure in the liquid circulated into cartridge seat 10, typically in the range of 7 to 23 bar, such as 12 to 18 bar.

At the end of the brewing process, valve 80' can be deactivated so as to release the pressure in piston chamber 25. Hence, cartridge supports 20,30 are unsealed and allowed to separate. Typically, valve 80', which may be a solenoid valve, is deactivated after the deactivation of pump 60.

Valve 80' can be opened shortly after shut-off of pump 60, e.g. 0.1 to 2 seconds such as 0.3 to 1.5 sec, to reduce the pressure in the fluid line, in particular in piston chamber 25. Hence, pressure drop in piston chamber 25 permits spacing of supports 20,30 to form a passage 35' leading into drip tray arrangement 50' as indicated by the arrow down-coming from passage 35' onto drip tray 50'. It follows, that upon beverage extraction, residual liquid contained in cartridge seat 10 does not drip at beverage outlet 35 under the effect of any overpressure remaining upstream cartridge seat 10. Internal pressure is directly released via valve 80' and residual liquid in seat 10 can be evacuated via passage 35' into drip tray 50' located thereunder.

Such a pressure release electro-valve may also be used in an extraction device that has no hydraulic opening/closure mechanism. Indeed, by using this internal pressure release system, liquid contained in the cartridge seat will not be pushed out via outlet 35 under the effect of residual pressure built up downstream the pump upon shutting off the pump. This significantly reduces the dripping at nozzle 35.

It will be noted that the pressure release via valve 80' does not necessarily involve venting the fluid line. In a first mode of operation involving the mere pressure release in the fluid line, the latter is not vented. Indeed, the problem of drops formed at the beverage outlet upon extraction can be inhibited or suppressed merely by reducing the internal pressure of the circuit, in particular equalizing the internal pressure with the external pressure, via the pressure release valve. For releasing the pressure, pressure release valve 80' may be opened for a period of time of at least 0.05 sec, e.g. for a period of time extending from shortly after stopping the pump to re-closing the cartridge seat around a new cartridge, or a shorter period of time, depending on the configuration of the hydraulically actuatable and movable cartridge support as discussed above.

In a second optional mode of operation, it is of course also possible to use valve 80' to vent the fluid line. In this case, air should be allowed into the fluid line, e.g. at the level of check-valve 80 or cartridge seat 10 upon re-opening thereof. For example, check-check valve 80 is a three-way valve used also for venting the fluid line.

Providing a short delay after shut-off of pump 60 and before opening valve 80', e.g. less than 3 seconds, allows normal completion of the extraction of cartridge 2 in cartridge seat 10 and dispensing of the beverage via outlet 35. When the normal extraction process is over, i.e. the pressure in extraction chamber 10 has at least started to drop, valve 80' will be opened. This prevents that the pressure built up in cartridge seat 10 is released upstream and that the content of cartridge seat is urged backwards into the fluid line towards pressure release valve 80'.

The invention claimed is:

1. A device for receiving an ingredient cartridge and extracting the ingredient by passing liquid through the cartridge for preparing a beverage, comprising:
   a cartridge seat for receiving the cartridge for extraction, the cartridge seat comprising a first cartridge support and a second cartridge support facing the first cartridge support, the first and second cartridge supports being movable relative to one another from an open position for insertion or removal of the cartridge into the seat to a closed position for passing liquid through the cartridge;
   a beverage outlet connected to the cartridge seat for dispensing beverage during extraction; and
   a liquid injection arrangement comprising a pump for pressurising and circulating liquid from a source via the cartridge seat into the beverage outlet, the liquid injection arrangement comprising a valve between the pump and the cartridge seat, the liquid injection arrangement configured to selectively release, via the valve, pressure from the pressurised liquid in the injection arrangement after the pump is stopped, so as to inhibit dripping from the beverage outlet, the liquid injection arrangement configured to maintain liquid in the injection arrangement from the pump to the cartridge seat after the pump is stopped, and the liquid injection arrangement comprising a second valve designed to build up a controlled pressure in unheated circulating liquid, at least one support of the first and second cartridge supports is hydraulically actuatable and movable into the closed position by the liquid injection arrangement, and the liquid injection arrangement is configured to:
   pressurise and circulate unheated liquid to the at least one support for actuating and moving the at least one support by the circulating unheated pressurised liquid; and
   guide the circulating unheated pressurised liquid under pressure from the at least one support via a heater into the cartridge seat for extracting the ingredient.

2. The device of claim 1, wherein the valve is a one-way valve.

3. The device of claim 1, wherein the liquid injection arrangement is configured:
  in a first mode, to release the pressure and maintain the liquid upon pressure release in the liquid injection arrangement between the pump and the cartridge seat; and
  in a second mode, to purge the liquid from the injection arrangement between the pump and the cartridge seat by venting the injection arrangement therebetween through the valve.

4. The device of claim 1, wherein the liquid injection arrangement is designed to open the pressure release valve for a period of time of at least 0.05 sec.

5. The device of claim 1, wherein the liquid injection arrangement comprises an inline heater between the pump and the cartridge seat, the valve being located between the pump and the heater.

6. The device of claim 1, wherein the liquid injection arrangement is configured to delay after the pump is stopped the release of pressure in the liquid.

7. The device of claim 6, wherein the hydraulically movable cartridge support moves away from the facing support by the pressure release in the liquid injection arrangement via the valve.

8. The device of claim 6, wherein the liquid injection arrangement injects heated liquid into the cartridge seat through a liquid inlet in one of the cartridge supports, the facing cartridge support having an outlet for dispensing liquid upon extraction of the ingredient.

9. The device of claim 1, wherein at least one of the cartridge supports is movable towards and away from the facing cartridge support by a mechanical drive arrangement.

10. The device of claim 1, wherein the pump provides a pressure in the range of 5 to 25 bar in the liquid circulated into the cartridge seat.

11. The device of claim 1, wherein the liquid injection arrangement delays after the pump is stopped the release of pressure in the liquid for a period of time ranging from 0.1 to 5 sec.

12. The device of claim 1, wherein the at least one hydraulically movable cartridge support comprises a hydraulic piston movable in a piston chamber, the liquid injection arrangement being connected to the piston chamber for injecting pressurised liquid into the chamber and driving hydraulically the support with the piston against the facing support into the closed position, the liquid injection injecting unheated pressurised liquid into the piston chamber and guiding via the in-line heater the liquid under pressure from the piston chamber into the cartridge seat, the piston chamber having an inlet and an outlet for circulating pressurised liquid through the piston chamber while the cartridge supports are in the closed position.

13. The device of claim 7, wherein a drip tray is associated with a used cartridge collector, for collecting liquid draining from in-between the cartridge supports that are moved away from one another.

14. The device of claim 9, wherein a force transmission lever is selected from the group consisting of a knuckle arrangement, a force transmission gear arrangement, and a spur gear arrangement.

15. A device for receiving an ingredient cartridge and extracting the ingredient by passing liquid through the cartridge for preparing a beverage, comprising:
  a cartridge seat for receiving the cartridge for extraction, the cartridge seat comprising a first cartridge support and a second cartridge support facing the first support, the first and second cartridge supports being movable relative to one another from an open position for insertion or removal of a cartridge into the seat to a closed position for passing liquid through such a cartridge;
  a beverage outlet connected to the cartridge seat for dispensing beverage during extraction; and
  a liquid injection arrangement comprising a pump for pressurising and circulating liquid from a source via the cartridge seat into the beverage outlet, the liquid injection arrangement comprising a valve between the pump and the cartridge seat, the liquid injection arrangement configured to selectively release, via the valve, pressure from the pressurised liquid in the injection arrangement and maintain liquid in the injection arrangement from the pump to the cartridge seat after the pump is stopped, so as to inhibit dripping from the beverage outlet, and the liquid injection arrangement configured to pressurise and circulate unheated liquid to the at least one support for actuating and moving the at least one support by the circulating unheated pressurised liquid, and to guide the circulating unheated pressurised liquid under pressure from the at least one support via a heater into the cartridge seat for extracting the ingredient, and at least one support of the cartridge supports being hydraulically actuatable and movable into the closed position by the liquid injection arrangement.

16. The device of claim 15, wherein the at least one hydraulically movable cartridge support comprises a hydraulic piston movable in a piston chamber, the liquid injection arrangement being connected to the piston chamber for injecting pressurised liquid into the chamber and driving hydraulically the support with the piston against the facing support into the closed position, the liquid injection injecting unheated pressurized liquid into the piston chamber and guiding via the in-line heater the liquid under pressure from the piston chamber into the cartridge seat, the piston chamber having an inlet and an outlet for circulating pressurised liquid through the piston chamber while the cartridge supports are in the closed position.

\* \* \* \* \*